United States Patent
Tai

(10) Patent No.: US 6,527,953 B2
(45) Date of Patent: Mar. 4, 2003

(54) STRUCTURE OF A WATER PURIFIER

(76) Inventor: Yu-Cheng Tai, PO Box 82-144, Taipei (TW)

(*) Notice: Subject to any disclaimer, the term of this patent is extended or adjusted under 35 U.S.C. 154(b) by 0 days.

(21) Appl. No.: 09/842,698

(22) Filed: Apr. 27, 2001

(65) Prior Publication Data

US 2002/0157998 A1 Oct. 31, 2002

(51) Int. Cl.$^7$ .............................. B01D 35/06; C02F 9/00
(52) U.S. Cl. ....................... 210/223; 210/222; 210/259; 210/262; 210/263; 210/295; 210/323.2
(58) Field of Search .................. 210/222, 223, 210/232, 252, 259, 262, 263, 695, 295, 323.1, 323.2

(56) References Cited

U.S. PATENT DOCUMENTS

| | | | | |
|---|---|---|---|---|
| 4,052,317 A | * | 10/1977 | Palnik | 210/323.2 |
| 4,248,714 A | * | 2/1981 | Acosta | 210/323.2 |
| 6,013,180 A | * | 1/2000 | Wang | 210/323.1 |
| 6,294,089 B1 | * | 9/2001 | Yeh | 210/222 |
| 6,312,595 B1 | * | 11/2001 | Chien | 210/223 |

* cited by examiner

Primary Examiner—David A. Reifsnyder
(74) Attorney, Agent, or Firm—Leong C. Lei

(57) ABSTRACT

A water purifier including a cover body mounted on top of a cylindrical seat having a partition board, with a delicate filtering cylinder and a plurality of filtering cylinders mounted on to the partition board in two rows. The partition board has a surrounding edge provided with a plurality of circular holes, each of the plurality of circular holes having a cavity box arranged underneath, each of the plurality of cavity boxes having two magnets and a cover board. A plurality of water conduits connects said delicate filtering cylinder and said plurality of filtering cylinders via said circular holes. The cylindrical seat also includes control panel provided with a water inlet for connecting to a tap, a water outlet port for magnetized and purified water, and an overflow port for removing water which accumulates at the partition board.

1 Claim, 6 Drawing Sheets

STRUCTURE OF A WATER PURIFIER

BACKGROUND OF THE INVENTION (a) Field of the Invention

The present invention relates to a structure of a water purifier, and in particular, an easy mounting, lightweight, and compact water purifier, which allows the replacement of filtering media to upgrade water content.

(b) Description of the Prior Art

FIGS. 1 and 2 show the structure of a conventional purifier comprising a top cover A and a cylindrical body B. The cover A and the body B are screwed together as screw threads are provided along the region of connection for the cover A and body B. The cylindrical body B contains a plurality of PVA filtering media and the body B is divided into a plurality of compartments to accommodate the filtering media. The compartments contain a plurality filtering materials such as active carbon, magnetized mineral and resin, etc. so as to filter water flowing through the media from the top to the bottom of the compartment. In the process of installation the conventional water purifier, these filtering materials have to be placed into the cylindrical body B layers by layers, and each layer has to be separated by PVA filtering media. In view of the above, the installation process for such conventional water purifier is laborious and time-consuming. Besides, the mounting of filtering media into the cylindrical body B is rather difficult, and in the course transporting the water purifier, the layers of the filtering media are easily mixed up. Additionally, after a period of use, if the cylindrical body is to be washed, the filtering media may not be easily withdrawn.

Accordingly, it is a prime object of the present invention to provide a structure of a water purifier, which can provide purified water, and the installation of the water purifier is simple.

SUMMARY OF THE INVENTION

Accordingly, it is an object of the present invention to provide a structure of a water purifier, which mitigates the drawbacks of the conventional water purifiers.

Yet another object of the present invention is to provide a structure of a water purifier, which can be easily installed, lightweight, compact in size and the filtering media can be easily replaced.

Other object and advantages of the present invention will become more apparent from the following description taken in conjunction with the accompanying drawing.

DETAILED DESCRIPTION OF THE PRESENT INVENTION

Figure 1:
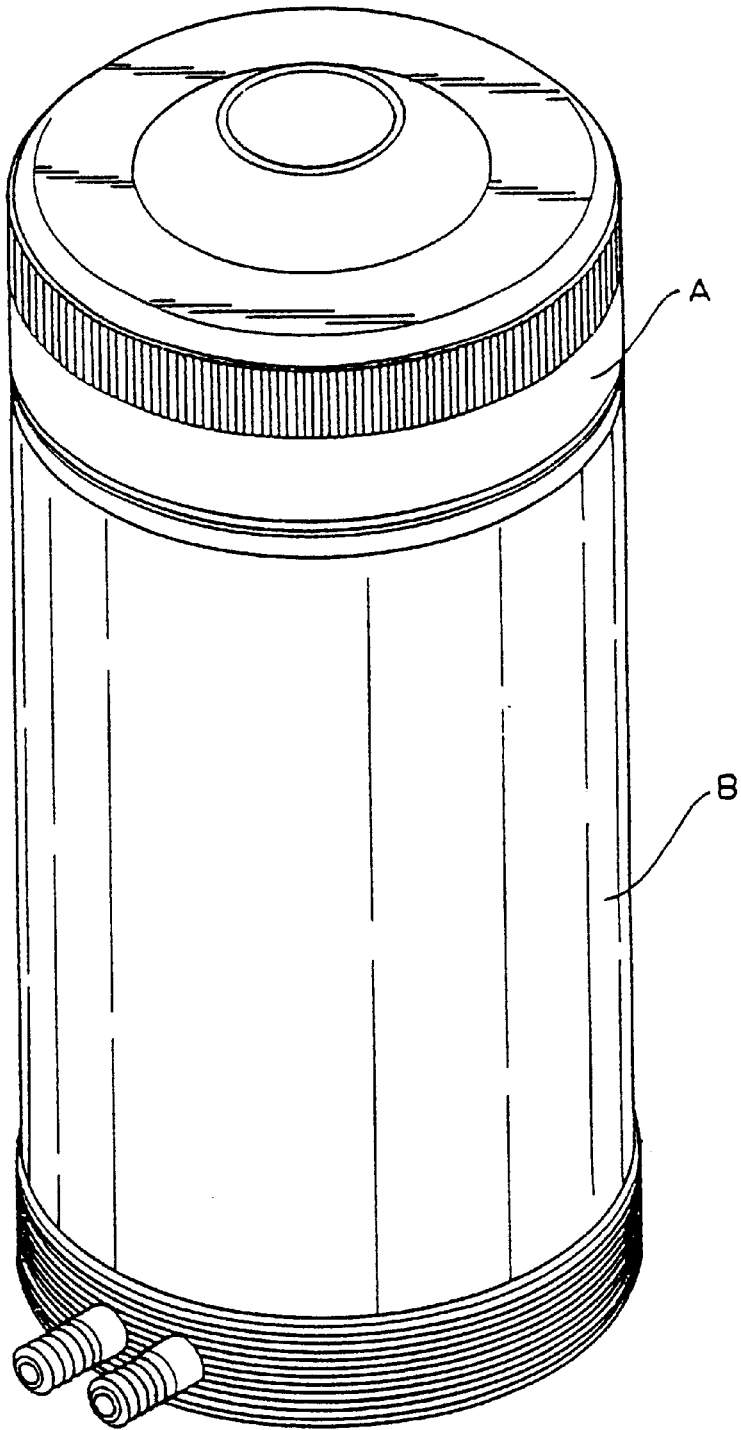
FIG. 1 is a perspective view of a conventional water purifier.
Figure 2:
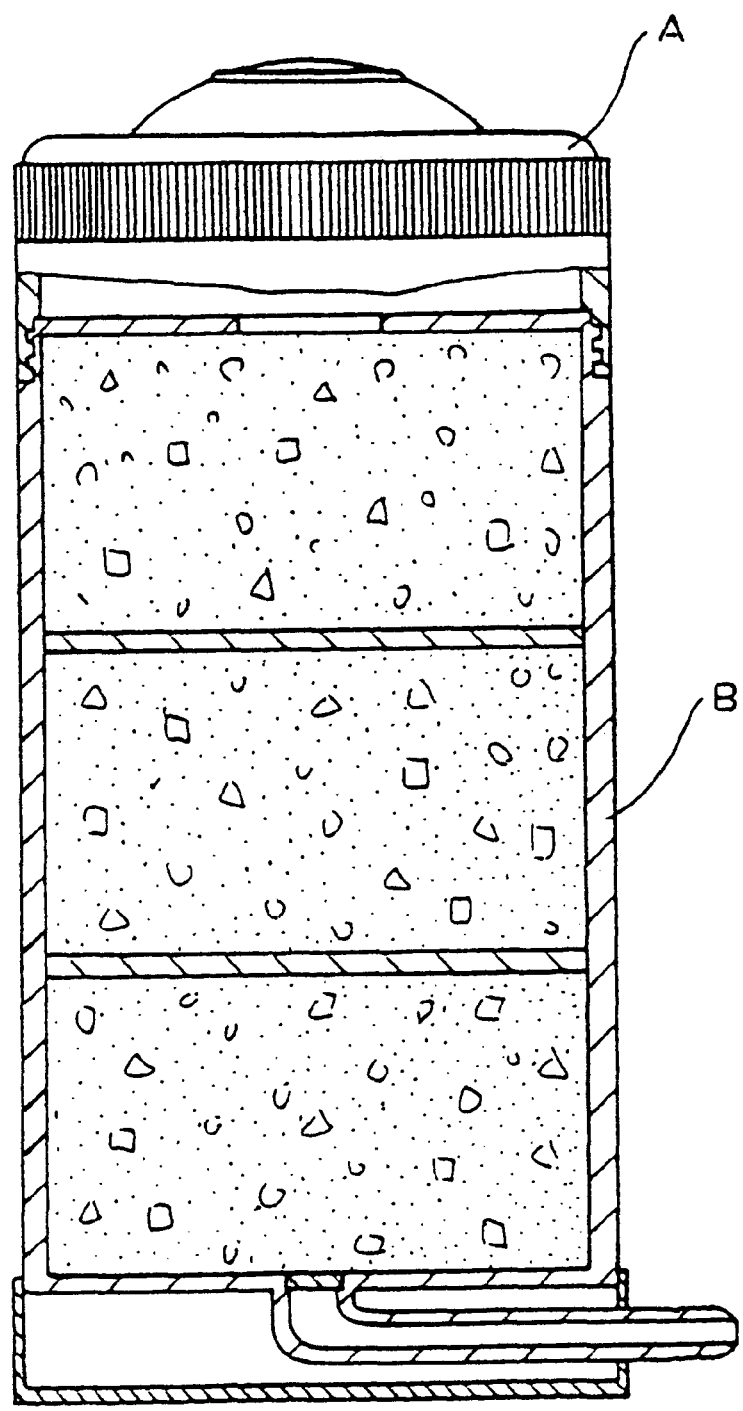
FIG. 2 is a sectional view of the conventional water purifier.
Figure 3:
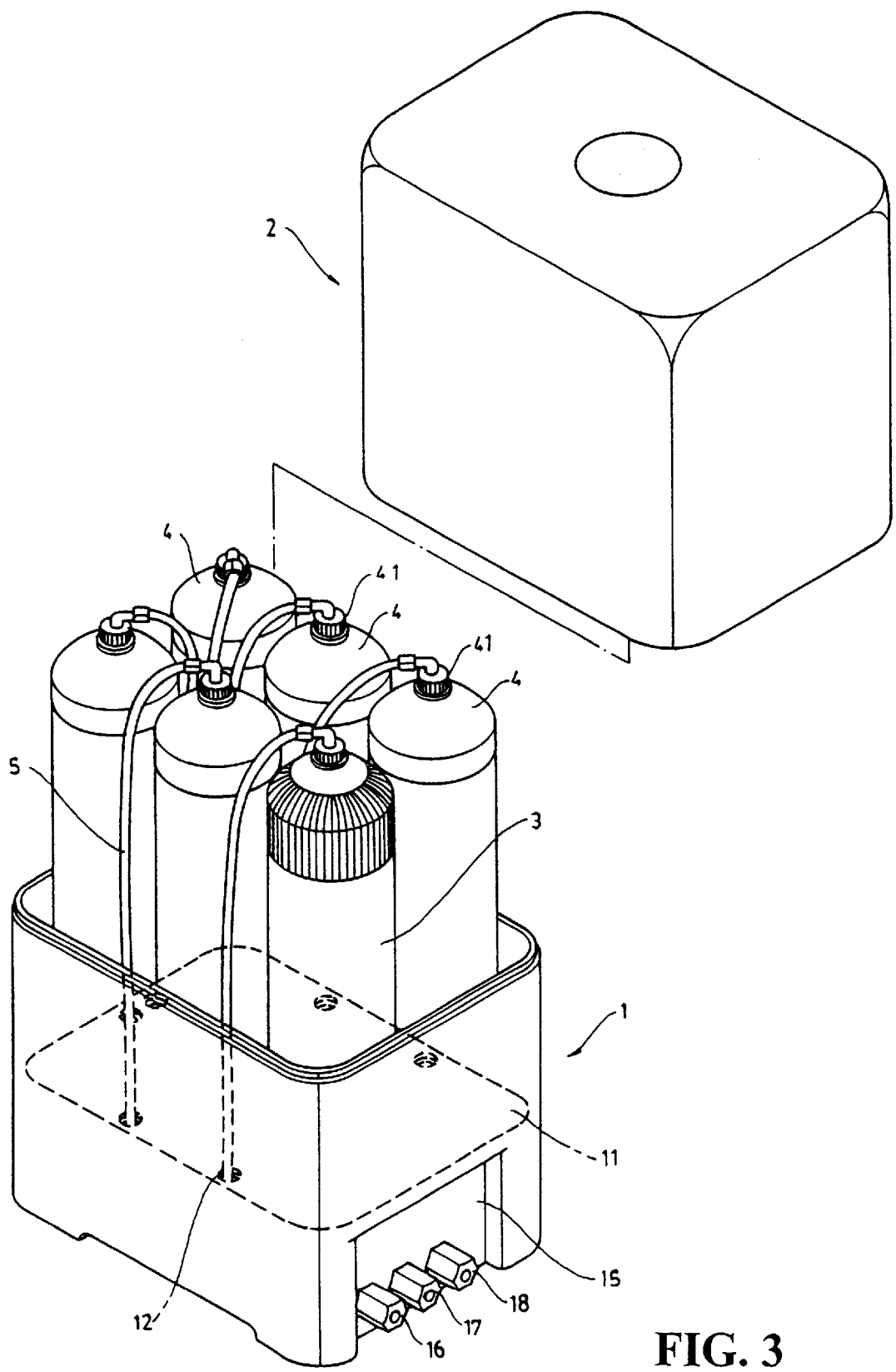
FIG. 3 is a perspective view of the water purifier of the present invention.
Figure 4:
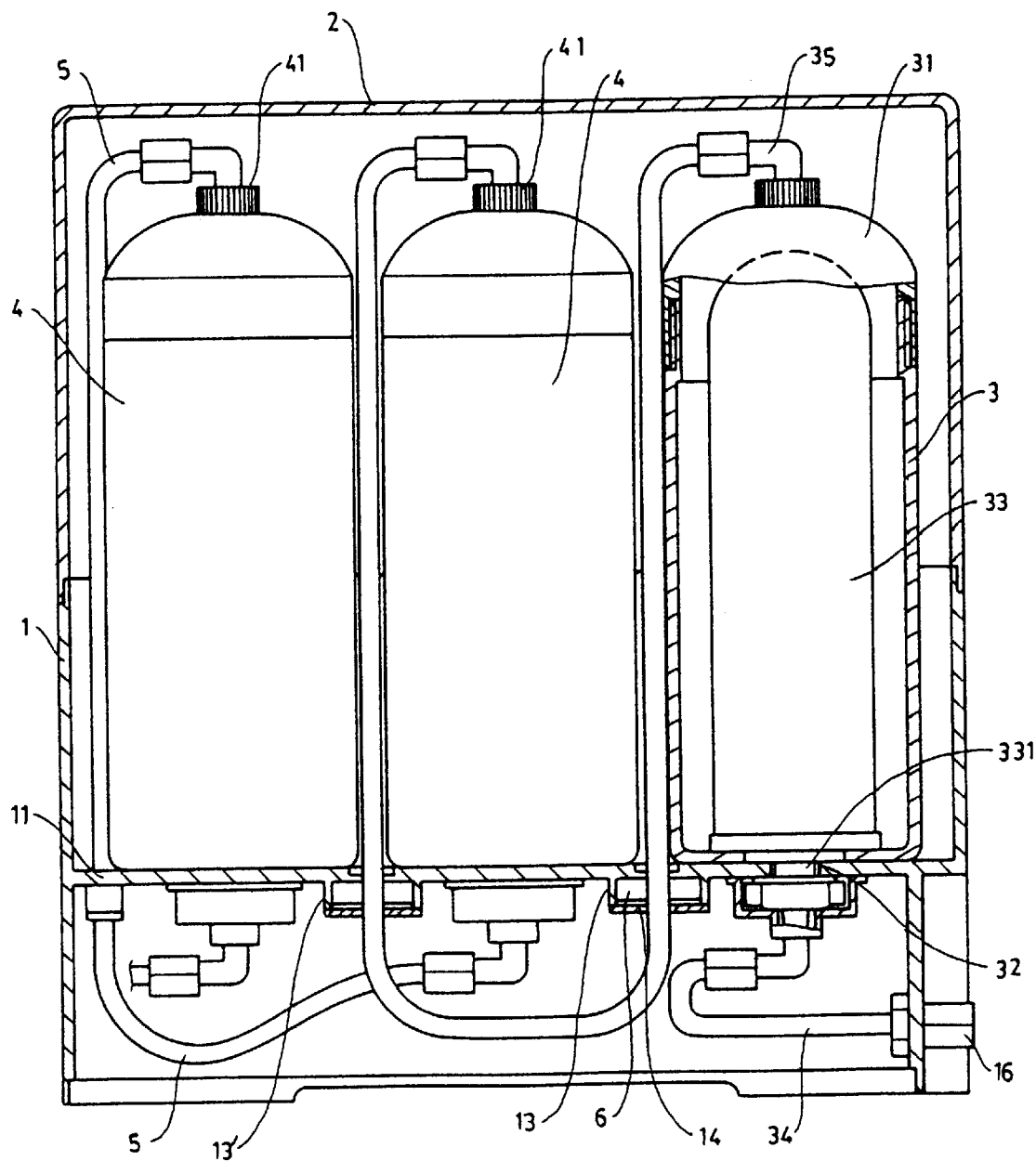
FIG. 4 is a partial sectional view of the water purifier of the present invention.
Figure 5:
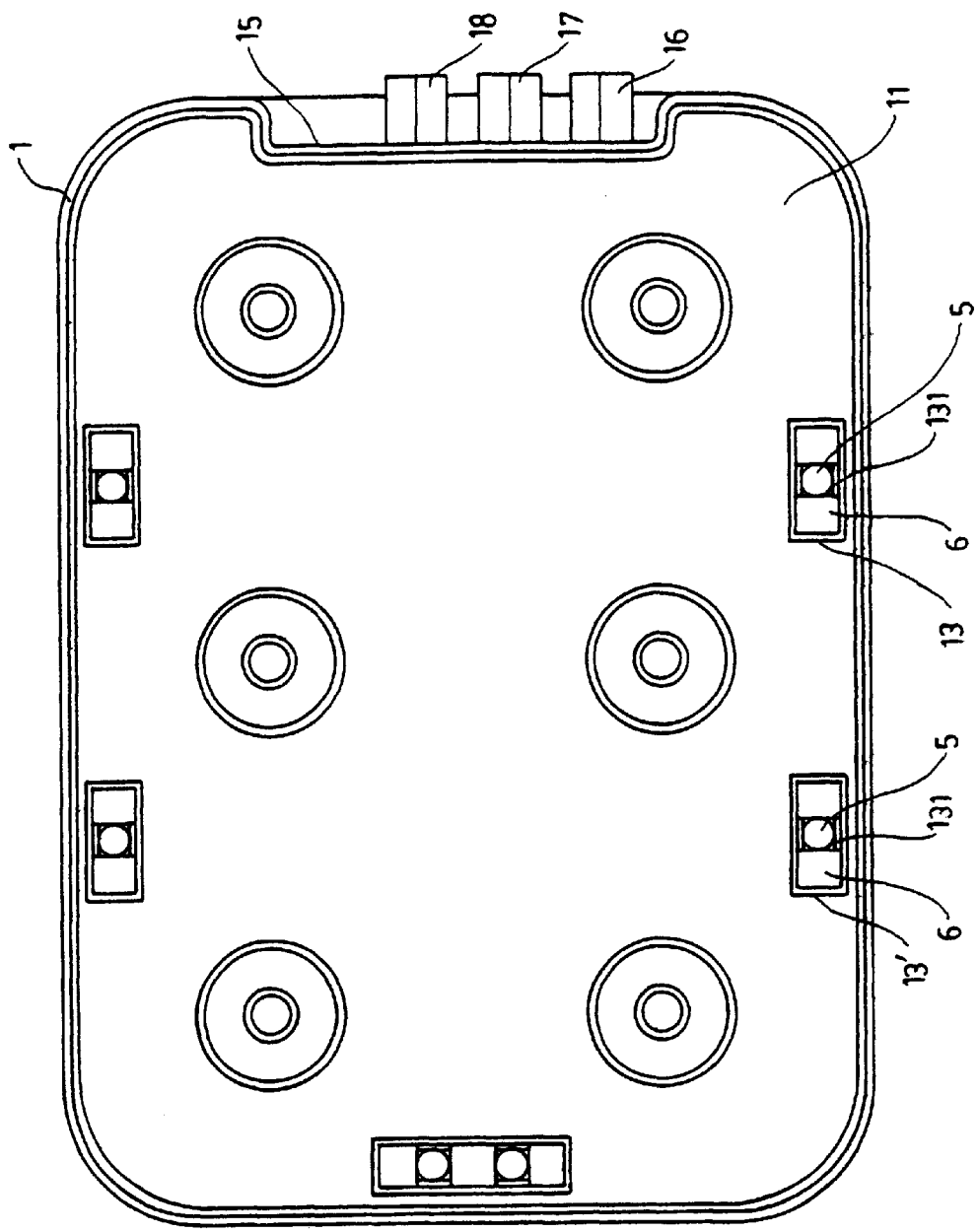
FIG. 5 is a sectional view of the bottom portion of the water purifier of the present invention.
Figure 6:
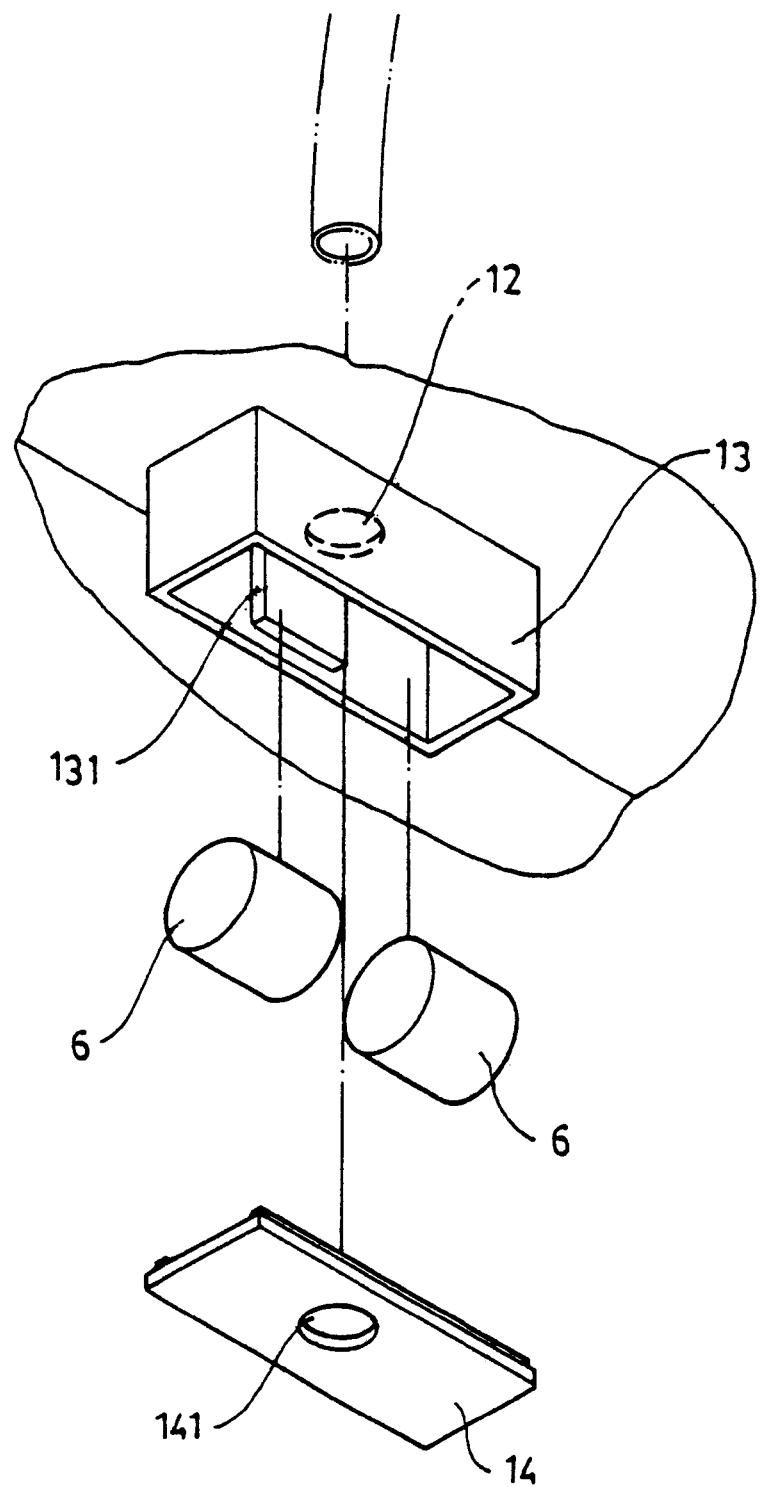
FIG. 6 is a perspective combination view of the cavity box, cover plate, magnet and water conduit of the present invention.

Referring to FIGS. 3, 4, 5 and 6, there is shown a structure of a water purifier comprising a cylindrical seat 1, a cover body 2, a delicate filtering cylinder 3 and a plurality of filtering cylinders 4. The cylindrical seat 1 is substantially a box-like shape, and its bottom has a partition board 11. The top face of the partition board 11 is provided with the delicate filtering cylinder 3 and the plurality of filtering cylinders 4 arranged in two rows. The surrounding side of the partition board 11 is provided with a plurality of circular holes 12 for mounting with water conduit 5. The circular holes 12 on the bottom face of the partition board 11, beside the circular hole 12, are provided with cavity box 13 (referring to FIGS. 5, 6). The interior of the cavity box 13 is provided with two magnets 6 and the two sides of the magnet 6 are provided with a corresponding protruded board 131.

The protruded board 131 allows the two magnets 6 to be blocked. The bottom face of the cavity box 13 is provided with a cover board 14. The center of the cover board 14 has a hole 141, corresponding to the circular hole 12. This allows the water conduit 5 to pass through the circular hole 12 and hole 141, and the water in the conduit 5 is magnetized by the two magnets 6 to produce magnetized water. A control panel 15 is provided at one side of the cylindrical seat 1 and the control panel 15 has a water inlet connection port 16, a water outlet connection port 17, and an overflow connection port 18 and the external end of the connection port 16 is connected to the tap so as to lead water into the interior of the delicate filtering cylinder 3 for preliminary filtering. The external end of the water connection port 17 is connected to a purification switch so as to lead the purified and magnetized clean water for usage. The overflow connection port 18 is used to draw out the water accumulated at the partition board 11.

The side of the cylindrical seat 1 is provided with a stepped slot for the cover body 2. The cover body 2 is elongated in shape to allow the cover to be mounted on the top of the cylindrical seat 1 and to cover the delicate filtering cylinder 3 and a plurality of filtering cylinders 4 within the cylindrical seat 1. The delicate filtering cylinder 3 is cylindrical in shape (referring to FIG. 4), and the top portion is a screw cap 31. The bottom portion is a hollow, screw rod seat 32 for the positioning of a screw hole on the top face of the partition board 11. The center of the delicate filtering cylinder 3 has a ceramic filtering body 33, and the bottom of the center of the ceramic filtering body 33 is a hollow water outlet rotating rod which is rotatably connected to the screw rod seat 32. That is, the rotating rod is connected to the screw rod seat 32. The bottom end outlet of the screw rod seat 32 is connected to a water inlet conduit 34, and one end of the conduit 34 is connected to water inlet connection port 16 of the control panel 15. The water inlet conduit 34 passes through the cavity box 13 and water from the port 16 will be magnetized by the magnet 6, and then enters the water inlet conduit 34 to the ceramic filtering body 33 to be purified. In other words, water passes the magnet 6 and is magnetized and is then directed from the bottom of the delicate filtering cylinder 3. When the water flows to the interior of the ceramic body 33, water is diffused out and is purified by the ceramic filtering body 33, and is then to the interior of the delicate filtering cylinder 3. The purified water from the delicate filtering cylinder 3 is flowing out via the water conduit 35. The water conduit 35 is then passed through the cavity body 13 containing magnet 6, and then passed through a plurality of filtering cylinders 4 to proceed with the second to the sixth time filtering and magnetizing.

In accordance with the present invention, the shape of the delicate filtering cylinder 3 is similar to that of a plurality of filtering cylinders 4. The top portion of the plurality of filtering cylinder 4 has an inlet or outlet port 41 to connect to a water conduit. The screw rod seat at the bottom is provided with a partition board to contain active carbon, magnetized stone or resin filtering media The water passed through water conduit 5 is guided to a filtering cylinder 4, and after it is purified, it is then discharged. The conduit 5 passes through a cavity box 13 so that the magnet 6 magnetizes the water. The totally purified and magnetized water is directed out via the water connection port 17 provided on the control panel 15 for usage.

In accordance with the present invention, the top portion of the cylindrical seat 1 is provided with a cover body 2 for covering, and the partition board 11 is used to hold the delicate filtering cylinder 3 and a plurality of filtering cylinders 4. In the case where the filtering media is to be replaced, the cover body 2 is opened and the filtering media is released. In accordance with the present invention, the mounting of the water inlet, water outlet and water overflow port 16, 17, 18 are provided on the panel 15 allowing the user to connect via conduit. Besides, the circular holes 12 on the partition board 11 are provided with a cavity box 13 containing two magnets 6 allowing the water to be magnetized.

While the invention has been described with respect to preferred embodiment, it will be clear to those skilled in the art that modifications and improvements may be made to the invention without departing from the spirit and scope of the invention. Therefore, the invention is not to be limited by the specific illustrative embodiment, but only by the scope of the appended claims.

I claim:

1. A water purifier comprising a cylindrical seat, a cover body, a delicate filtering cylinder and a plurality of filtering cylinders, said cover body being mounted on top of said cylindrical seat, said cylindrical seat having a partition board, said delicate filtering cylinder and said plurality of filtering cylinders being mounted and arranged on said partition board in two rows, said partition board having a surrounding edge provided with a plurality of circular holes, a plurality of water conduits connecting said delicate filtering cylinder and said plurality of filtering cylinders via said circular holes, and a plurality of cavity boxes are mounted on a bottom of said partition board, a respective one of said plurality of cavity boxes is arranged under a respective one of said plurality of circular holes, each of said plurality of cavity boxes is provided with two magnets and a cover board covering a bottom of each of said plurality of cavity boxes, said cylindrical seat has a control panel provided with a water inlet connection port, a water outlet connection port, and an overflow connection port, wherein said inlet connection port is for connecting to a water tap so as to lead water through a respective one of said plurality of cavity boxes and through the delicate filtering cylinder to magnetize and preliminary filter the water, after which the magnetized and preliminary filtered water is then led through the remainder of said plurality of cavity boxes and the plurality of filtering cylinders for further magnetizing and filtering.

* * * * *